Oct. 14, 1969          S. GRABL          3,473,106

OVERLOAD PROTECTION FOR A VOLTAGE-REGULATED POWER SUPPLY

Filed April 14, 1966

INVENTOR.
SEBASTIAN GRABL

BY

*Christie, Parker & Hale*

ATTORNEYS

United States Patent Office  3,473,106
Patented Oct. 14, 1969

3,473,106
OVERLOAD PROTECTION FOR A VOLTAGE-REGULATED POWER SUPPLY
Sebastian Grabl, Pasadena, Calif., assignor to Burroughs Corporation, Detroit, Mich., a corporation of Michigan
Filed Apr. 14, 1966, Ser. No. 542,605
Int. Cl. G05f 1/10, 3/02; H02j 1/04
U.S. Cl. 323—9      10 Claims

ABSTRACT OF THE DISCLOSURE

An overload protection circuit having a nonlinear resistive element connected in series with the load and means for limiting the current flowing to the load through the nonlinear resistive element when the voltage across the nonlinear resistive element exceeds a predetermined value. The nonlinear resistive element has a resistance that is directly related in magnitude to the current flowing through it, such as for example a lamp. Circuitry is also provided that limits the load current in direct relation to the load voltage after overload protection commences.

---

This invention relates generally to power supplies, and more specifically, to overload protection circuits for a voltage-regulated power supply.

In a voltage-regulated power supply it is desirable to provide overload protection to limit the current flowing through the load, when the load impedance drops below a minimum value. Otherwise, as the load approaches a short-circuit condition, the load current would increase without bound in an attempt to maintain a regulated load voltage. When the load current becomes too large, the danger exists that the power rating of the load and the voltage-regulating element will be exceeded, thus damging these components. In view of the tolerances that circuit elements demonstrate, one of the major problems associated with implementing overload protection is to design a circuit in which the value of load impedance at which overload protection commences operation is closely determined.

According to one aspect of the invention an overload protection circuit for a voltage-regulated power supply is provided having a special resistive element connected in series with the load and means for limiting the current flowing to the load through the special resistive element, when the voltage across the special resistive element exceeds a predetermined value. The circuitry for sensing the voltage across the special resistive element is connected across the special resistive element is connected across the special resistive element to the exclusion of the voltage regulating element so the tolerances of the voltage regulating element do not effect the point at which the current limiting means commences operation. The special resistive element has a resistance that is directly related in magnitude to the current flowing through it. A determination of the load current at which overload protection commences results that is relatively insensitive to the voltage tolerances of the circuit elements. To serve as the special resistive element a circuit element having a significant positive temperature coefficient within the operating temperature range of the power supply, such as a lamp, is particularly well suited. In this case, the special resistive element can operate as a thermal fuse in the event that the overload protection circuit does not properly respond.

A major problem particularly associated with provision of overload protection for a series-type, voltage-regulated power supply is power dissipation by the voltage-regulated power supply is power dissipation by the voltage-regulating element after overload protection commences. Power dissipation by the voltage-regulating element increases as a function of decreasing load impedance, after the load current is limited to a constant value by the operation of the overload protection circuit. This stems from the fact that as the load impedance drops during operation of the overload protection circuit, the voltage across the load also drops, causing the voltage across the voltage-regulating element to rise. Since the load current remains constant, power dissipation in the voltage-regulating element rises. Thus a circuit component with a sufficiently large power rating to meet these demands must be selected.

According to another aspect of the invention, an overload protection circuit is provided having means for limiting the load current in direct relation to the load voltage, after the load impedance drops below a minimum value in the course of the operation of the overload protection circuit. Thus as the load approaches a short-circuit condition, both the load current and load voltage drop, and the voltage-regulating element actually dissipates less power. The current value at which overload protection commences is a function of the resistance ratio of a voltage divider and can, therefore, be closely determined by selecting the resistance ratio of the voltage divider. A resistive element is provided in series with the load to sense the load current. The voltage across this resistive element actuates the overload protection circuit. The resistive element can comprise a normal linear resistor or a nonlinear resistive element having a resistance that is directly related in magnitude to the current flowing through it. In the latter case, the current value at which overload protection commences can be, as previously discussed, even more closely determined.

These and other features of the invention are considered further in the following detailed description taken in conjunction with the drawings, in which.

Figure 1:
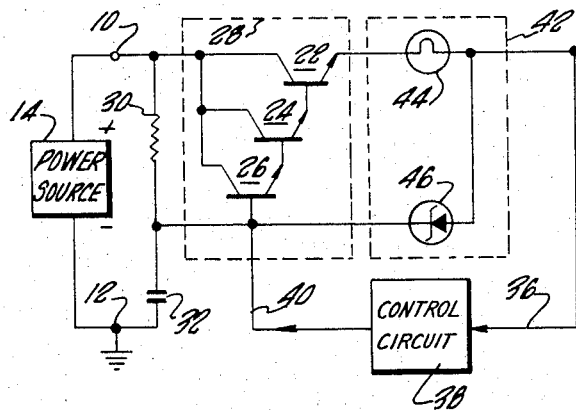
FIG. 1 is a schematic circuit diagram of a power supply employing overload protection.

In FIG. 1 a power supply is shown having an input circuit comprising terminals 10 and 12 to which a direct-current power source 14 is coupled and an output circuit comprising output terminals 16 and 18 to which a load 20 is coupled. The positive side of source 14 is connected to input terminal 10. Input terminal 12 and output terminal 18 are connected to a common ground. A transistor configuration of the so-called Darlington type constitutes a voltage-regulating element 28 connected in series between input terminal 10 and output terminal 16. The transistor configuration is formed by joining the collector leads of transistors 22, 24, and 26 directly together, joining the emitter lead of transistor 26 directly to the base lead of transistor 24, and joining the emitter lead of transistor 24 directly to the base lead of transistor 22. Considered as a single transistor the configuration has a collector formed by the three individual collector leads, a base formed by the base lead of transistor 26, and an emitter formed by the emitter lead of transistor 22. At the input circuit of the power supply a resistor 30, which determines in part the bias conditions of the transistor configuration is connected between input terminal 10 and the base of the transistor configuration and a capacitor 32, which suppresses oscillations at the base of the transistor configuration, is connected between it and input terminal 12. A capacitor 34 is coupled across output terminals 16 and 18 for smoothing out the load voltage. To develop a signal to control voltage-regulating element 28, the load voltage is sampled by means of a lead 36 connected to output terminal 16 and applied to a control circuit represented in FIG. 1 by a block 38 and shown in detail in FIG. 2. The output of the control circuit 38, which is a control signal representative of the load voltage, is applied by means of a lead 40 to the base of the transistor configuration. A lamp 44 inserted between the emitter of the transistor configuration and output terminal 16 and a Zener diode 46 inserted between the base of the transistor configuration and output terminal 16 comprise an overload protection circuit 42.

Load current flows between power source 14 and load 20 through the collector-to-emitter circuit of the transistor configuration and lamp 44. During normal operation, as the impedance of load 20 varies, the load voltage between output terminals 16 and 18 tends to change. To oppose this change in load voltage, the base-to-emitter current of the transistor configuration is adjusted by a signal generated in control circuit 38. The load current flowing through the collector-to-emitter circuit of the transistor configuration is thereby changed so as to effect regulation of the load voltage. When the impedance of load 20 drops below a predetermined value indicating that the power supply is no longer operating normally, the load current, which is the current passing through lamp 44, rises above a maximum value. This condition is sensed by the voltage appearing across lamp 44. As Zener diode 46, a component is selected with a specified Zener breakdown voltage equal to the sum of the voltage appearing between the base and emitter of the transistor configuration and the voltage across lamp 44, when the load current is at the maximum value, as determined from the characteristic curves of transistors 22, 24, and 26 and lamp 44. Thus the tolerances on the maximum load current are a function of the tolerances of the characteristics of transistors 22, 24, and 26 and Zener diode 46. After Zener diode 46 breaks down, a constant voltage is impressed upon the base-to-emitter circuit of the transistor configuration, which converts the transistor configuration into a constant current source, thereby providing a constant limit load current flow between power source 14 and load 20 irrespective of further drops in load impedance.

Lamp 44 has a substantial positve temperature coefficient within the operating temperature range of the power supply. A General Electric 1680 lamp could, for example, be used. An increase in the current passing through lamp 44 increases the temperature of its filament and consequently its resistance. The increase in resistance of lamp 44 as a function of current at current values near the maximum load current results in a closer tolerance on the maximum load current. This can be explained by the following considerations. The tolerances on the emitter-to-base voltage of transistors 22, 24, and 26 and the Zener breakdown voltage of Zener diode 46 impose a tolerance on the voltage across lamp 44 at which overload protection commences. Because the resistance of lamp 44 is not constant within the voltage tolerance range of lamp 44, but instead increases, the current tolerance of lamp 44, according to Ohm's law, smaller on a percentage basis than the voltage tolerance of lamp 44. Thus the maximum load current is more closely determined for given voltage tolerances on transistors 22, 24, and 26 and Zener diode 46, than would be the case if a linear resistor were employed instead of lamp 44. Although a lamp is particularly well-suited, any nonlinear circuit element having a resistance that is directly related in magnitude to the current flowing therethrough produces the described improvement in the determination of the maximum load current. In this specification, the term "directly related" is used in the sense that the resistance increases in magnitude as the current flowing through it increases and decreases in magnitude as the current flowing through it decreases.

A disadvantage of overload protection circuit 42 of FIG. 1 is that the limit current is a constant value regardless of the load impedance. During operation of overload protection circuit 42, the power dissipation of the transistor configuration increases as the load impedance decreases, because the load voltage decreases. This increases the voltage drop across the collector-to-emitter circuit of the transistor configuration, while the load current remains constant.

Figure 2:
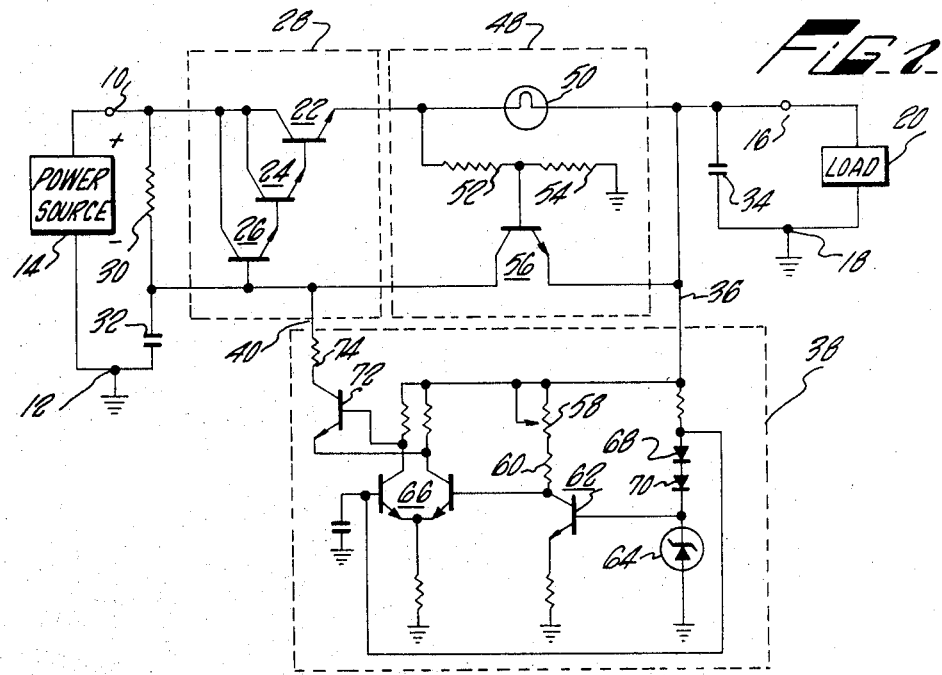
FIG. 2 is a schematic circuit diagram of a power supply arranged according to the invention.

In FIG. 2 a power supply is shown that overcomes the disadvantage described in the preceding paragraph and permits even closer determination of the maximum load current. With the exception of the substitution of an overload protection circuit 48 for overload protection circuit 42 of FIG. 1, the power supplies of FIGS. 1 and 2 are identical and their components, therefore, bear the same numbers. In addition, the details of the control circuit for generating the signal that controls voltage-regulating element 28, shown in FIG. 1 as block 38, are depicted in FIG. 2.

As part of overload protection circuit 48, resistive element 50, which is preferably a lamp, but which, in this embodiment, could be any resistive element, is connected in series between the emitter of the transistor configuration and output terminal 16. A voltage divider comprising resistors 52 and 54 in series is inserted between the emitter of the transistor configuration and ground. The base of a transistor 56 is connected to the junction of resistors 52 and 54, its collector is connected to the base of the transistor configuration, and its emitter is connected to output terminal 16. The voltage divider forms a bridge circuit with lamp 50 and load 20. By recourse to Kirchhoff's current and voltage laws the current, $I_L$, through lamp 50 can be expressed as $$I_L = \frac{R_1}{R_L} I_B + \frac{R_1}{R_2} \frac{E_0}{R_L} + \left(1 - \frac{R_1}{R_2}\right) \frac{E_B}{R_L}$$

where $R_1$ is the resistance of resistor 52, $R_L$ is the resistance of lamp 50, $I_B$ is the base current of transistor 56, $R_2$ is the resistance of resistor 54, $E_0$ is the load voltage of the power supply, and $E_B$ is the base-to-emitter voltage drop of transistor 56. By design the first term of the equation is made insignificant with respect to the second and third terms. During normal operation, the load voltage is maintained constant independent of the load impedance and transistor 56 is cut off. As the load impedance drops below the value at which overload protection circuit 48 is to operate, the current passing through lamp 50 exceeds the maximum value. As a result, the voltage drop across lamp 50 rises sufficiently to cause the base-to-emitter circuit of transistor 56 to become forward biased and bring transistor 56 out of cutoff. At this point, the second term of the equation is much larger than the third term, so that the maximum current through lamp 50 is essentially a first order function of the resistance ratio of resistors 52 and 54, the resistance of lamp 50 and the load voltage. Thus its tolerances depend on the tolerances of the resistance of resistors 52 and 54 and lamp 50. Precision resistors and lamps manufactured to high tolerances are readily available, relatively cheap circuit components. So a close determination of the point at which overload protection circuit 48 commences to operate is easily achieved. After transistor 56 starts to conduct, control current from lead 40 is diverted from the base of the transistor configuration to the collector of transistor 56, thereby reducing the load current flowing through the collector-to-emitter circuit of the transistor configuration. Since the limit load current is directly related to the load voltage, as represented by the second term of the equation, the limit load current decreases as the load impedance decreases thereby preventing an increase in power dissipation in voltage-regulating element 28. Actually, the power dissipation in voltage-regulating element 28 drops as the load impedance drops. As the load impedance approaches short circuit, the third term in the equation becomes more dominant. This term is independent of the load voltage and current, and represents a lower boundary value below which the limit load current does not drop.

Figure 3:
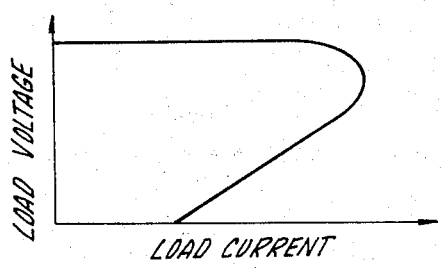
FIGS. 3 and 4 are graphs illustrating the operating characteristics of the power supply of FIG. 2.

FIG. 3 is a graph illustrating how the load current, during normal operation, increases so the load voltage remains regulated. When overload protection circuit 48 commences to operate near the knee of the curve, the limit load current is thereafter directly related to load voltage.

Figure 4:
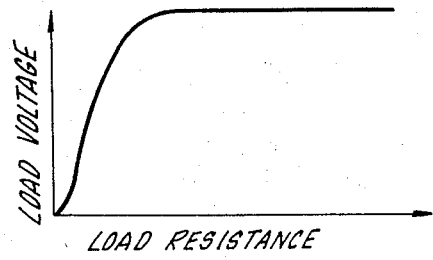

FIG. 4 is a graph illustrating how the load voltage remains regulated as a function of load impedance until the load impedance drops below a minimum value at which time the load voltage begins to sink.

Use of a lamp or other nonlinear element with a resistance that is directly related in magnitude to the current flowing therethrough for resistive element 50 permits a closer determination of the point at which the overload protection circuit 48 commences to operate than use of a linear resistor, in the same way as in the embodiment of FIG. 1. Some improvement in the determination, however, can still be attained by employing a linear resistor as element 50, because the determination depends only on the tolerances of $R_1$, $R_2$, and $R_L$. Furthermore, overload protection circuit 48 in the latter case, still limits the load current in direct relation to the load voltage.

As an additional safeguard against current overload in the event that overload protection circuits 48 and 42 do not respond properly, lamp 50 in FIG. 2 and lamp 44 in FIG. 1 are designed to burn out when a current slightly larger than the maximum load current passes through them. Thus the lamp functions additionally as a thermal fuse.

To produce the control signal for voltage regulating element 28, the load voltage is sampled by lead 36 at output terminal 16 and applied through a variable resistor 58 and a fixed resistor 60 to the collector of a transistor 62. The base voltage of transistor 62 is maintained constant by a Zener diode 64, thus producing an essentially constant current through resistors 58 and 60. As a result, changes in load voltage are exactly duplicated at the collector of transistor 62 at a lower voltage level. The voltage at the collector of transistor 62 is applied to one input of a difference amplifier 66. A reference voltage for application to the other input of difference amplifier 66 is generated across the series combination of Zener diode 64 and forward biased normal diodes 68 and 70. The output of difference amplifier 66 is applied between the base and emitter of a transistor 72, out of whose collector the control current flows through a resistor 74 to lead 40 for application to voltage-regulating element 8.

Proper selection of the thermal time constants of the transistor configuration and resistive element 50 permits the control circuitry to respond to short period overload requirements and at the same time to limit short period overload to safe values. Generally speaking, the thermal time constant of resistive element 50 must be smaller than that of the transistor configuration.

What is claimed is:
1. A voltage-regulated power supply comprising:
   (a) an input circuit across which a source of direct-current power is to be connected;
   (b) an output circuit across which a load is to be connected, the output circuit being coupled to the input circuit;
   (c) a voltage regulating element connected in series between the input circuit and the output circuit so as to regulate the voltage appearing across the output circuit;
   (d) a nonlinear resistive circuit element having a resistance that is directly related in magnitude to the current flowing through it and being connected in series with the voltage regulating element between the input and output circuits so that the current flowing to the output circuit flows through it; and
   (e) means responsive to the voltage across the resistive circuit element to the exclusion of the voltage across the voltage regulating element for limiting the current flowing to the output circuit responsive to the rise of the voltage across the resistive circuit element above a maximum value.

2. The power supply of claim 1 in which the resistive circuit element has a substantial positive temperature coefficient within the operating temperature range of the power supply.

3. The power supply of claim 2 in which the resistive circuit element is a lamp.

4. The power supply of claim 1 in which the means for limiting current flowing to the output circuit limits in direct relation to the voltage across the output circuit.

5. The voltage-regulated power supply of claim 1, in which the voltage regulating element has a control terminal, the limiting means comprises a switch having first and second terminals between which an open circuit normally exists and a control terminal for establishing a closed circuit between the first and second terminals, the first and second terminals of the switch are connected respectively between the control terminal of the voltage regulating element and one terminal of the output circuit, and the control element is connected between the junction of the voltage regulating element and the resistive circuit element.

6. A voltage-regulated power supply comprising:
   (a) first and second input terminals across which a source of direct-current power is to be connected;
   (b) first and second output terminals across which a load is to be connected;
   (c) a transistor configuration for controlling the load current flowing between the input terminals and the output terminals and having an emitter, a base, and a collector, the collector being connected to the first input terminal;
   (d) a nonlinear resistive circuit element having a resistance that is directly related in magnitude to the current flowing through it and being connected between the emitter and the first output terminal;
   (e) means connecting the second input terminal and the second output terminal to a common ground;
   (f) means for applying a control signal proportional to the voltage appearing between the first and second output terminals to the base of the transistor configuration to control the load current so as to maintain the voltage across the output terminals constant;
   (g) first and second resistors connected in series between the common ground and the junction between the emitter of the transistor configuration and the nonlinear resistive circuit element; and
   (h) means for limiting the load current responsive to the rise of voltage between the junction of the first and second resistors and the common ground above a predetermined value.

7. A voltage-regulated power supply comprising:
   (a) first and second input terminals across which a source of direct-current power it to be connected;
   (b) first and second output terminals across which a load is to be connected;
   (c) a transistor configuration for controlling the load current flowing between the input terminals and the output terminals and having an emitter, a base, and a collector, the collector being connected to the first input terminal;
   (d) a nonlinear resistive element connected between the emitter and the first output terminal, the element having a resistance that is directly related in magnitude to the current flowing through it;
   (e) means connecting the second input terminal and the second output terminal to a common ground;
   (f) means for applying a control signal proportional to the voltage across the first and second output terminals to the base of the transistor configuration to control the load current so as to maintain the voltage across the output terminals constant;
   (g) a second transistor with an emitter, a base, and a collector, the collector being connected to the base of the transistor configuration and the emitter being connected to the first output terminal;

(h) a first resistor connected between the emitter of the transistor configuration and the base of the second transistor; and (i) a second resistor connected between the base of the second transistor and the common ground, the value of the second resistor being such that the second transistor is cut off until the voltage across the nonlinear resistive element rises above a maximum value.

8. The power supply of claim 7 in which the resistive element has a significant positive temperature coefficient within the operating temperature range of the power supply.

9. The power supply of claim 8 in which the resistive element is a lamp designed to burn out when the current through it exceeds a maximum value.

10. The power supply of claim 8 in which the thermal time constant of the resistive element is shorter than that of the transistor configuration.

References Cited

UNITED STATES PATENTS

| | | | |
|---|---|---|---|
| 3,388,316 | 6/1968 | Gately | 323—9 |
| 2,697,811 | 12/1954 | Deming | 323—4 X |
| 2,904,742 | 9/1959 | Chase | 323—9 X |
| 3,049,632 | 8/1962 | Staples. | |
| 3,090,905 | 5/1963 | Ehret. | |
| 3,102,225 | 8/1963 | Kenny et al. | 323—9 X |
| 3,109,980 | 11/1963 | Wiley. | |
| 3,241,026 | 3/1966 | Andrich | 323—94 X |

OTHER REFERENCES

Westinghouse Technical Data Sheet 54–967, September 1963, p. 1, 323–68.

LEE T. HIX, Primary Examiner

A. D. PELLINEN, Assistant Examiner

U.S. Cl. X.R.

317—20, 31, 33, 42; 323—22